United States Patent
Jeon et al.

(10) Patent No.: US 10,050,247 B2
(45) Date of Patent: Aug. 14, 2018

(54) SEPARATION MEMBRANE COATING AGENT COMPOSITION, SEPARATION MEMBRANE MADE FROM COATING AGENT COMPOSITION, AND BATTERY USING SAME

(71) Applicant: SAMSUNG SDI CO., LTD., Yongin-si, Gyeonggi-do (KR)

(72) Inventors: In Sik Jeon, Suwon-si (KR); Jin Kyu Park, Suwon-si (KR); Jun Ho Chung, Suwon-si (KR); Ki Chul Hong, Suwon-si (KR); Geon Ja Lim, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 371 days.

(21) Appl. No.: 14/418,849

(22) PCT Filed: Jul. 31, 2013

(86) PCT No.: PCT/KR2013/006893
§ 371 (c)(1),
(2) Date: Jan. 30, 2015

(87) PCT Pub. No.: WO2014/021634
PCT Pub. Date: Feb. 6, 2014

(65) Prior Publication Data
US 2015/0207123 A1  Jul. 23, 2015

(30) Foreign Application Priority Data
Aug. 1, 2012  (KR) .................. 10-2012-0084536

(51) Int. Cl.
*H01M 2/16* (2006.01)
*C09D 179/08* (2006.01)
(Continued)

(52) U.S. Cl.
CPC ........ *H01M 2/1686* (2013.01); *C08G 73/105* (2013.01); *C08G 73/1039* (2013.01);
(Continued)

(58) Field of Classification Search
None
See application file for complete search history.

(56) References Cited

U.S. PATENT DOCUMENTS 8,808,923 B2    8/2014  Nakagiri et al.
2005/0107526 A1*  5/2005  Katou .................. C09D 179/08
                                                          524/606

(Continued)

FOREIGN PATENT DOCUMENTS

JP      06-071148      3/1994
JP      2002-355938 A  12/2002
(Continued)

OTHER PUBLICATIONS

JP 2002355938 A E/N Translation—2002.*
(Continued)

*Primary Examiner* — Lucas J. O'Donnell
(74) *Attorney, Agent, or Firm* — Lee & Morse, P.C.

(57) ABSTRACT

Disclosed herein is a coating composition having excellent thermal resistance and drying processability, utilizing polyamic acid having high thermal resistance and excellent solubility in a low boiling point solvent. Specifically, the coating composition includes polyamic acid and a low boiling point solvent having a boiling point less than 150° C. Also, disclosed herein a separator having improved thermal resistance by coating the coating composition on one or both surfaces of a polyolefin-based substrate film, and an electrochemical battery having improved thermal stability by using the separator.

15 Claims, 1 Drawing Sheet

(51) Int. Cl.
*H01M 10/052* (2010.01)
*C08G 73/10* (2006.01)
*C09D 177/10* (2006.01)
*H01M 2/14* (2006.01)
*C09D 7/20* (2018.01)
*C08K 5/109* (2006.01)
*C08K 5/20* (2006.01)
*C08K 5/41* (2006.01)

(52) U.S. Cl.
CPC ..... *C08G 73/1042* (2013.01); *C08G 73/1064* (2013.01); *C08G 73/1067* (2013.01); *C08G 73/1078* (2013.01); *C08G 73/1082* (2013.01); *C09D 7/20* (2018.01); *C09D 177/10* (2013.01); *C09D 179/08* (2013.01); *H01M 2/145* (2013.01); *H01M 2/1653* (2013.01); *H01M 10/052* (2013.01); *C08K 5/109* (2013.01); *C08K 5/20* (2013.01); *C08K 5/41* (2013.01)

(56) References Cited

U.S. PATENT DOCUMENTS

| | | | |
|---|---|---|---|
| 2007/0281206 A1* | 12/2007 | Fujikawa | H01M 2/145 429/62 |
| 2010/0273976 A1* | 10/2010 | Igor | C07C 61/06 528/322 |
| 2011/0020701 A1* | 1/2011 | Park | H01M 4/133 429/206 |
| 2013/0115519 A1 | 5/2013 | Lee et al. | |
| 2013/0244080 A1 | 9/2013 | Song et al. | |

FOREIGN PATENT DOCUMENTS

| | | | |
|---|---|---|---|
| JP | 2002355938 A | * | 12/2002 |
| JP | 2007-125821 A | | 5/2007 |
| KR | 10-2003-0010406 A | | 2/2003 |
| KR | 10-2010-0099667 A | | 9/2010 |
| KR | 10-2011-0071059 A | | 6/2011 |
| KR | 10-2011-0136745 A | | 12/2011 |
| WO | WO 2009/102009 A1 | | 8/2009 |
| WO | WO 2011/159087 A2 | | 12/2011 |
| WO | WO 2012/042716 A1 | | 4/2012 |

OTHER PUBLICATIONS

International Search Report dated Nov. 28, 2013 in corresponding International Patent Application No. PCT/KR2013/006893.

U.S. Appl. No. 14/418,785, filed Jan. 30, 2015, Ula Corinna Ruddock.

USPTO Office action dated Jun. 6, 2017, in U.S. Appl. No. 14/418,785.

* cited by examiner

[FIG. 1]
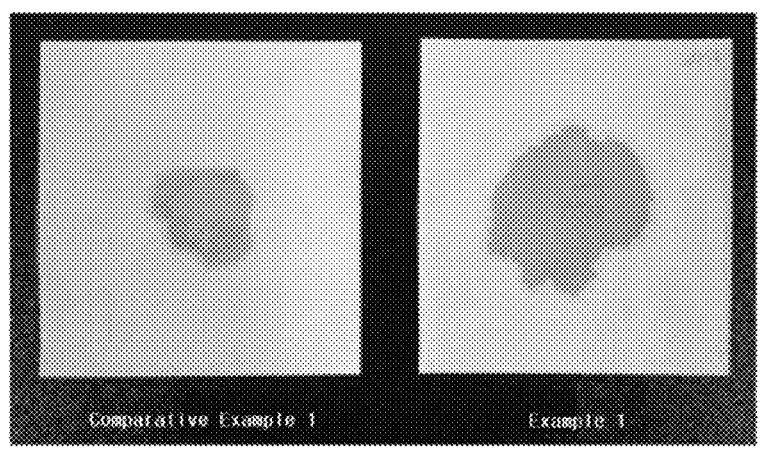
[FIG. 2]
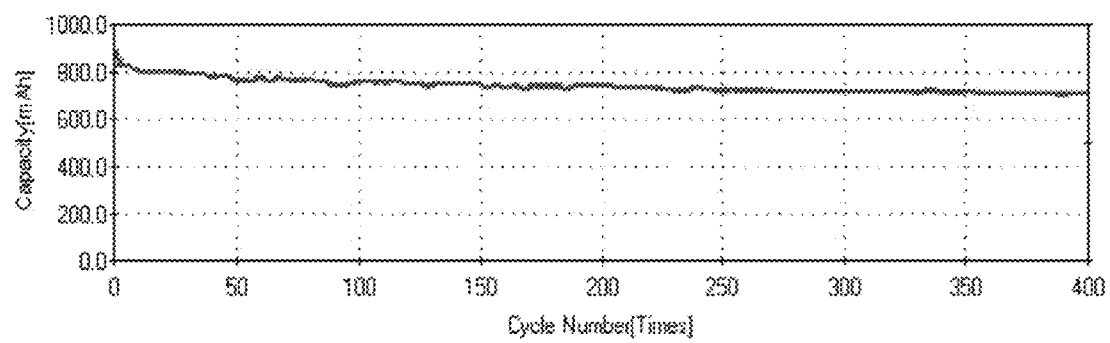

SEPARATION MEMBRANE COATING AGENT COMPOSITION, SEPARATION MEMBRANE MADE FROM COATING AGENT COMPOSITION, AND BATTERY USING SAME

TECHNICAL FIELD

The present invention relates to a composition for coating a separator. Further, the present invention relates to a high thermal resistant separator coated with the composition, and an electrochemical battery using the same.

BACKGROUND ART

A separator for an electrochemical battery refers to an intermediate membrane segregating a cathode and an anode from each other in a battery, while continuously maintaining ion conductivity, thereby allowing battery charging and discharging.

Recently, along with weight lightening and miniaturization trend of an electrochemical battery for high portability of an electronic device, a battery is also required to have high power and large capacity in order to be used for an electric car, and the like. Thus, a separator for a battery is required to be thin and have light weight, and at the same time, to have excellent thermal shape stability for production of a high power battery.

Particularly, in case where a polyolefin-based film is used as a substrate film of the separator, the film may melt down even at relatively low temperature, and thus, in order to compensate for such a problem, a study to improve the thermal resistance of the substrate film has proceeded. It is suggested in Korean Patent Registration No. 10-0775310, etc. that a coating layer of a mixture of organic and inorganic materials is formed on one or both surfaces of a substrate film of a separator, in order to improve the thermal resistance of a substrate film.

Meanwhile, an attempt has been made to improve thermal stability of a coating layer, by using an organic binder having excellent thermal resistance such as polyimide as a coating agent component of a separator. However, the organic binder having high thermal resistance generally does not dissolve in a low boiling point solvent, which later causes a problem of being properly unable to performing a drying process of the solvent after coating a separator. Moreover, this not only decreases air permeability of a separator, but also reduces compatibility with other coating agent components added together so as to make it difficult to be substantially utilized as a coating agent.

Therefore, the development of a coating agent which has excellent thermal resistance, is easily prepared, and also has excellent drying processability, is needed.

DISCLOSURE OF INVENTION

Technical Problem

An object of the present invention is to provide a coating composition having excellent thermal resistance and drying processability, by utilizing polyamic acid having excellent solubility in a low boiling point solvent as a coating agent component of a separator.

Another object of the present invention is to provide a separator having a less solvent residual amount in a coating layer so as to have excellent air permeability, and improved thermal resistance.

Another object of the present invention is to provide an electrochemical battery having excellent thermal stability, by using the separator.

Technical Solution

In one general aspect, a composition for coating a separator includes polyamic acid, and a low boiling point solvent having a boiling point less than 150° C.

In another general aspect, a separator is formed by coating the separator with the composition on one or both surfaces of a polyolefin-based substrate film.

In another general aspect, a separator includes a polyolefin-based substrate film; and a coating layer containing polyamic acid formed on one or both surfaces of the substrate film, wherein the coating layer has an organic solvent residual amount of 500 ppm or less therein.

In another general aspect, a method of preparing a coated separator includes preparing a polyolefin-based substrate film, applying a coating composition containing polyamic acid, a low boiling point solvent and a high boiling point solvent on one or both surfaces of the polyolefin-based substrate film to form a coating layer, and drying the coating layer.

In another general aspect, an electrochemical battery includes the separator, a cathode, an anode, and electrolyte.

In another general aspect, a lithium secondary battery includes the separator.

Advantageous Effects

Coating the coating composition of the present invention on a polyolefin-based substrate film may lead a less solvent residual amount in a coating layer of a dried separator, thereby not reducing air permeability, and compensate for the thermal sensitivity of polyolefin, thereby enhancing the thermal resistance of the separator.

The coating composition of the present invention includes a low boiling point solvent, so that an organic solvent content in a coating layer may be adjusted to be low after forming the coating layer without undergoing a severe drying process.

Further, the polyamic acid used in the coating composition of the present invention may maintain the dispersibility of inorganic particles in an inorganic dispersion, so as to improve the preparation processability of a coating layer of a mixture of organic and inorganic materials.

Further, the high thermal resistant separator coated with the coating composition of the present invention has strong resistance to thermal shrinkage which occurs upon overheating of a battery, so that the battery has improved stability, and extended life.

BRIEF DESCRIPTION OF DRAWINGS

FIG. 1 is a photograph showing electrolyte solution wettability of the separator according to an exemplary embodiment of the present invention.

FIG. 2 is a graph showing capacity change with usage time of a battery using the separator according to an exemplary embodiment of the present invention.

BEST MODE

Hereinafter, the present invention will be described in detail. Since the part not disclosed herein may be sufficiently recognized and inferred by a person skilled in the art to which the invention pertains or in the similar art, a description thereof will be omitted.

The coating composition according to exemplary embodiments of the present invention includes polyamic acid, and a low boiling point solvent having a boiling point less than 150° C. In addition, the coating composition according to exemplary embodiments of the present invention may further include inorganic particles.

The polyamic acid used in exemplary embodiments of the present invention has excellent thermal resistance and solubility in a low boiling point solvent, thereby securing the thermal resistance of the separator with polyamic acid itself without proceeding with further imidation. In addition, since it does not need to carry out imidation at high temperature, the damage of a polyolefin substrate due to high temperature may be avoided. Therefore, a coating layer may be formed on a polyolefin-based substrate. Further, since its solubility in a low boiling point solvent is excellent, a high temperature drying process under a severe condition for removing a high boiling point solvent is not necessary, and thus, a coating layer may be formed on a polyolefin substrate. Though polyimide has excellent thermal resistance, it does not dissolve in a low boiling point solvent, so that it has not been substantially utilized as a coating agent component of the separator. Specifically, in a separator including a coating layer, if a large amount of solvent remains in the coating layer after drying, the separator will have reduced adhesion, and also decreased air permeability, and thus, not function properly as a separator. Therefore, in case where the separator is intended to be coated by a general coating method (in particular, dip coating), a low boiling point solvent has been used as a coating agent solvent, in order to facilitate drying of the solvent. However, in case of polyimide, since it does not dissolve in the low boiling point solvent, it has been difficult to be utilized in a separator coating layer in the prior art, in spite of its excellent thermal resistance. Thus, the problems in the prior art are intended to be solved in the present invention by introducing polyamic acid which has excellent thermal resistance and easily dissolves in a low boiling point solvent.

The polyamic acid used in exemplary embodiments of the present invention may have the structure of following Chemical Formula 1 or 2:

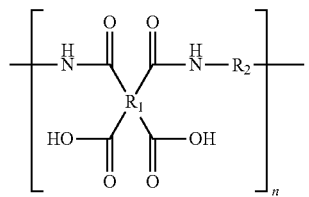

[Chemical Formula 1]

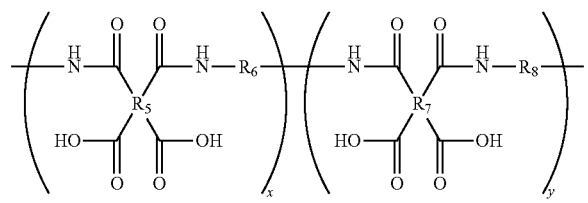

[Chemical Formula 2]

wherein $R_1$, $R_5$ and $R_7$ are, independently of one another, an unsubstituted or substituted aromatic hydrocarbon having 6 to 30 carbon atoms; an unsubstituted or substituted aliphatic hydrocarbon having 2 to 20 carbon atoms; or an unsubstituted or substituted alicyclic hydrocarbon having 3 to 24 carbon atoms. $R_1$, $R_5$ and $R_7$ may be identical to or different from one another.

Specifically, the aromatic hydrocarbon having 6 to 30 carbon atoms may be represented by following Chemical Formula 3:

[Chemical Formula 3]

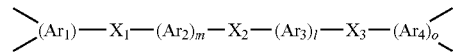

wherein $Ar_1$ to $Ar_4$ are, independently of one another, unsubstituted or substituted arylene having 6 to 15 carbon atoms, and $Ar_1$ to $Ar_4$ may be identical to or different from one another; and $X_1$ to $X_3$ are, independently of one another, a single bond, O, S, C(=O), S(=O)$_2$, C(=O)NH, unsubstituted or substituted alkylene having 1 to 10 carbon atoms, specifically alkylene having 1 to 4 carbon atoms, or unsubstituted or substituted silylene. For example, the substituted alkylene or silylene may be mono- or di-substituted by F, OH, $CH_3$, $CF_3$ and the like.

m, l and o are, independently of one another, 0 or 1. Specifically, if m is 1, and l and o are 0, $X_2$ and $X_3$ are a single bond, and $Ar_e$ is unsubstituted or substituted trivalent arylene having 6 to 15 carbon atoms, and if m and l are 1, and o is 0, $X_3$ is a single bond, and $Ar_a$ is unsubstituted or substituted trivalent arylene having 6 to 15 carbon atoms. If m, l and o are all 0, $X_1$ to $X_3$ are a single bond, and $Ar_1$ is unsubstituted or substituted tetravalent arylene having 6 to 15 carbon atoms, for example, unsubstituted or substituted tetravalent phenylene or naphthylene.

In the Chemical Formula 1 or 2, $R_2$, $R_6$ and $R_8$ are, independently of one another, an unsubstituted or substituted aromatic hydrocarbon having 6 to 30 carbon atoms; an unsubstituted or substituted aliphatic hydrocarbon having 2 to 20 carbon atoms; an unsubstituted or substituted alicyclic hydrocarbon having 3 to 24 carbon atoms; or —$R_3$—$Ar_5$—$R_4$— (wherein $R_3$ and $R_4$ are, independently of each other, alkylene having 1 to 5 carbon atoms; and $Ar_5$ is unsubstituted or substituted arylene having 6 to 15 carbon atoms, and if $Ar_5$ is substituted, it is mono- to tri-substituted by $CH_3$, OH, SH or $NH_2$.). $R_2$, $R_6$ and $R_8$ may be identical to or different from one another.

Specifically, in $R_2$, $R_6$ and $R_8$, the unsubstituted or substituted aromatic hydrocarbon having 6 to 30 carbon atoms may be represented by following Chemical Formula 4:

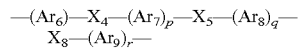

[Chemical Formula 4]

wherein $Ar_6$ to $Ar_9$ are, independently of one another, arylene having 6 to 15 carbon atoms, and $Ar_6$ to $Ar_9$ may be identical to or different from one another; and $X_4$ to $X_6$ are, independently of one another, a single bond, O, S, C(=O), S(=O)$_2$, C(=O)NH, unsubstituted or substituted alkylene having 1 to 10 carbon atoms, specifically alkylene having 1 to 4 carbon atoms, or unsubstituted or substituted silylene. For example, the substituted alkylene or silylene may be mono- or di-substituted by F, OH, $CH_3$, $CF_3$ and the like.

p, q and r are, independently of one another, 0 or 1. If p is 1, and q and r are 0, $X_5$ and $X_6$ are a single bond. Herein, $Ar_6$ and $Ar_7$ may be, independently of each other, unsubstituted or substituted phenylene or naphthylene. If p and q are 1, and r is 0, $X_6$ is a single bond. If p, q and r are all 0, $X_4$ to $X_6$ are a single bond.

In the Chemical Formula 4, $X_4$ may be in an ortho-, meta-, or para-position to an amine group (—NH—) of the Chemical Formula 1 or 2. Specifically, it may be in a meta-position, and in case of being in a meta-position to an amine group, its solubility may be improved.

In the Chemical Formula 1, n is an integer of 30 to 10000, an integer of 100 to 1000, an integer of 50 to 500, or an integer of 50 to 300.

In the Chemical Formula 2, x is an integer of 15 to 5000, and y is an integer of 15 to 5000, specifically, x may be an integer of 50 to 500, and y may be an integer of 50 to 500, and more specifically, x may be an integer of 25 to 250, and y may be an integer of 25 to 250.

According to an exemplary embodiment of the present invention, in the Chemical Formula 1 or 2, $R_1$, $R_2$, $R_5$, $R_6$, $R_7$ and $R_8$ may be, independently of one another, an unsubstituted or substituted aromatic hydrocarbon having 6 to 18 carbon atoms; an unsubstituted or substituted alicyclic hydrocarbon having 6 to 24 carbon atoms; or an unsubstituted or substituted aliphatic hydrocarbon having 2 to 17 carbon atoms, and in the aromatic hydrocarbon of the Chemical Formula 3 or 4, $Ar_1$ to $Ar_4$, or $Ar_6$ to $Ar_9$ may be, independently of one another, an unsubstituted or substituted arylene having 4 to 10 carbon atoms, specifically phenylene or naphthylene. Herein, in the Chemical Formula 3, m, l and o may be all 0, or m may be 1, and l and o may be 0, and in the Chemical Formula 4, p, q and r may be all 1, or q may be 1, and q and r may be 0.

The polyamic acid compound according to another exemplary embodiment of the present invention may be the compound wherein in the aromatic hydrocarbon of the Chemical Formula 3 or 4, $Ar_1$ to $Ar_4$ are unsubstituted, and $Ar_6$ to $Ar_9$ are, independently of one another, unsubstituted or substituted. If any one or more of $Ar_6$ to $Ar_9$ are substituted, they may be substituted by $CH_3$, $CF_3$, OH, F or the like, for example, $CH_3$ or $CF_3$.

The polyamic acid compound according to another exemplary embodiment of the present invention may be the compound wherein in the Chemical Formula 1 or 2, $R_1$, $R_5$ and $R_7$ are an unsubstituted or substituted phenylene or naphthylene, an unsubstituted or substituted alicyclic hydrocarbon having 4 to 12 carbon atoms, an aliphatic hydrocarbon having 4 to 7 carbon atoms, or two or three unsubstituted or substituted phenyl groups in the form of being connected by a single bond, O, S, C(=O), S(=O)$_2$, C(=O)NH, unsubstituted or substituted alkylene having 1 to 10 carbon atoms, unsubstituted or substituted silylene, and the like. The two or three unsubstituted or substituted phenyl groups may be, specifically, independently of each other, in the form of being connected by a single bond; C(=O); S(=O)$_2$; alkylene having 1 to 3 carbon atoms unsubstituted or mono- or di-substituted by $CH_3$ or $CF_3$; or silylene unsubstituted or mono- or di-substituted by $CH_3$ or $CF_3$. More specifically, the connecting group of the two or three phenyl groups may be a single bond, C(=O), C(CH$_3$)$_2$ or C(CF$_3$)$_2$. Alternatively, two phenyl groups may be connected by the connecting group. $R_2$, $R_6$ and $R_8$ may be an unsubstituted or substituted alicyclic hydrocarbon having 4 to 12 carbon atoms, an unsubstituted or substituted aliphatic hydrocarbon having 4 to 17 carbon atoms, or two to four unsubstituted or substituted phenyl groups in the form of being connected by a single bond, O, S, C(=O), S(=O)$_2$, C(=O)NH, unsubstituted or substituted alkylene having 1 to 10 carbon atoms, unsubstituted or substituted silylene, and the like. The two to four unsubstituted or substituted phenyl groups may be, specifically, independently of each other, in the form of being connected by a single bond; S(=O)$_2$; O; C(=O); alkylene having 1 to 3 carbon atoms unsubstituted or mono- or di-substituted by $CH_3$ or $CF_3$; or silylene unsubstituted or mono- or di-substituted by $CH_3$ or $CF_3$. More specifically, the connecting group of the two to four phenyl groups may be a single bond, C(=O), S(=O)$_2$, O, C(CH$_3$)$_2$ or C(CF$_3$)$_2$. In particular, the connecting group may be C(=O), S(=O)$_2$ or O. For example, two phenyl groups may be connected by the connecting group.

The polyamic acid compound according to another exemplary embodiment of the present invention may be the compound wherein in the Chemical Formula 1 or 2, $R_1$ and $R_5$ are unsubstituted or substituted phenylene or naphthylene, and $R_2$, $R_6$, $R_7$ and $R_8$ are two to four unsubstituted or substituted phenyl groups in the form of being connected by a single bond, O, S, C(=O), S(=O)$_2$, C(=O)NH, unsubstituted or substituted alkylene having 1 to 10 carbon atoms, unsubstituted or substituted silylene, or the like.

The term used herein, "aromatic hydrocarbon having 6 to 30 carbon atoms" includes all the cases where the aromatic hydrocarbon is present alone, two aromatic hydrocarbons are joined to form a condensed ring, or two or more aromatic rings are not joined to each other, but connected by another connecting group. The aromatic hydrocarbon present alone is exemplified by a divalent or tetravalent phenylene group, and two aromatic hydrocarbons joined to each other to form a condensed ring are exemplified by a divalent or tetravalent naphthylene group.

The term used herein, "arylene having 6 to 15 carbon atoms" includes an aromatic hydrocarbon having 6 to 15 carbon atoms wherein the aromatic hydrocarbon is present alone, or two aromatic hydrocarbons are joined to each other to form a condensed ring, and the arylene is exemplified by a phenylene or naphthylene group. The arylene may be di-, tri- or tetravalent, herein.

The term used herein, "alicyclic hydrocarbon having 3 to 24 carbon atoms" refers to a saturated or partially unsaturated hydrocarbon group containing 1 to 3 rings having 3 to 8 carbon atoms, respectively. For example, as the alicyclic hydrocarbon having 6 to 20 carbon atoms, a cyclohexyl, cycloheptyl, cyclohexenyl, or 1,2,3,4-tetrahydronaphthalene group may be mentioned.

The term used herein, "aliphatic hydrocarbon having 2 to 20 carbon atoms" refers to a saturated or partially unsaturated, straight-chained or branched-chained, di- or tetravalent hydrocarbon group. Specifically, it may refer to a saturated, straight-chained or branched-chained, di- or tetravalent hydrocarbon group. As an example of the aliphatic hydrocarbon having 2 to 20 carbon atoms, ethyl, butyl, pentyl, hexyl, 1,1-dimethylbutyl or the like may be used.

In case where the term, "unsubstituted or substituted" is used herein, unless otherwise stated, a group may be unsubstituted or substituted several times by F, OH, SH, $CH_3$, $CF_3$, $NH_2$ or the like. For example, a group may be mono- to tri-substituted by F, OH, SH, $CH_3$, $CF_3$, $NH_2$ or the like.

In case where $R_2$, $R_6$ or $R_8$ is phenylene, or $R_2$, $R_6$ or $R_8$ contains a phenylene group as a part herein, it may be, independently of one another, connected in an ortho-, meta- and para-position.

Specifically, in the Chemical Formulae 1 and 2, $R_1$, $R_5$ and $R_7$ may be selected from the group consisting of following Chemical Formulae A1 to A43.

[Chemical Formula A1]
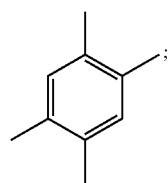
[Chemical Formula A2]
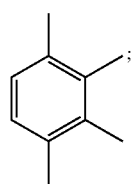
[Chemical Formula A3]
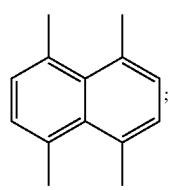
[Chemical Formula A4]
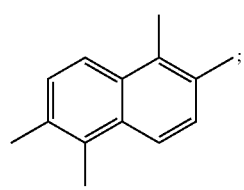
[Chemical Formula A5]
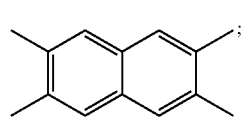
[Chemical Formula A6]
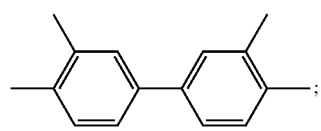
[Chemical Formula A7]
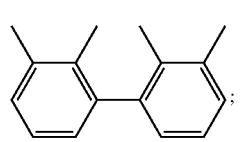
[Chemical Formula A8]
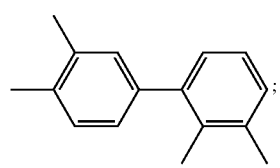
[Chemical Formula A9]
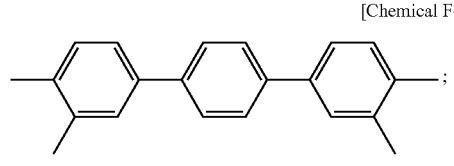
[Chemical Formula A10]
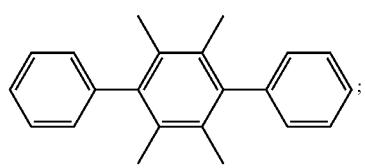
[Chemical Formula A11]
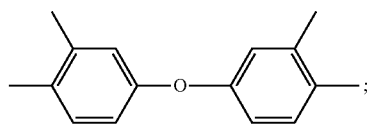
[Chemical Formula A12]
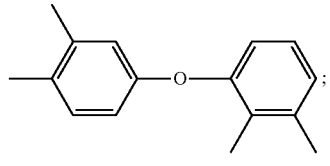
[Chemical Formula A13]
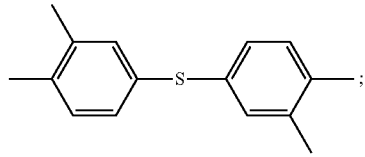
[Chemical Formula A14]
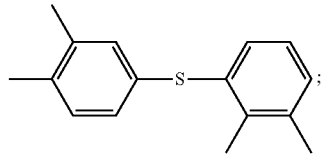
[Chemical Formula A15]
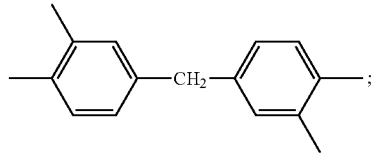
[Chemical Formula A16]
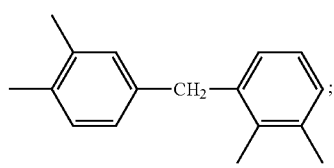
[Chemical Formula A17]
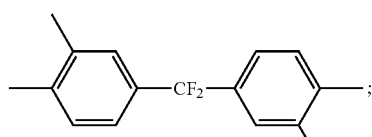
[Chemical Formula A18]
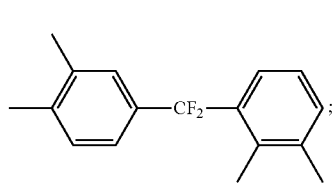

[Chemical Formula A19]
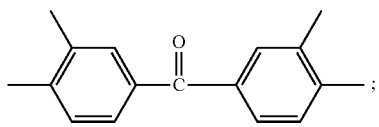
[Chemical Formula A20]
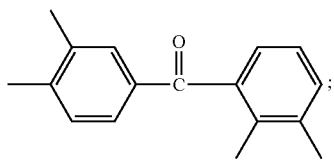
[Chemical Formula A21]
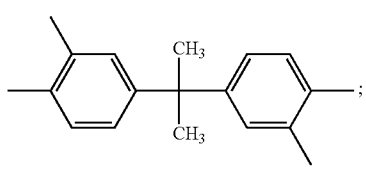
[Chemical Formula A22]
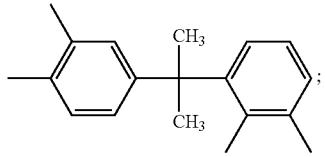
[Chemical Formula A23]
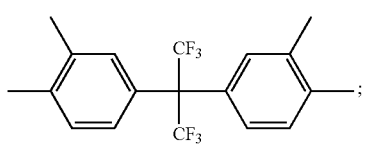
[Chemical Formula A24]
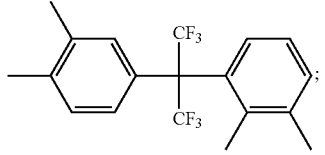
[Chemical Formula A25]
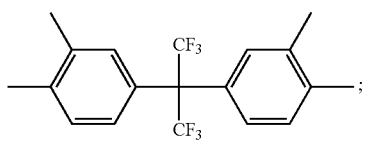
[Chemical Formula A26]
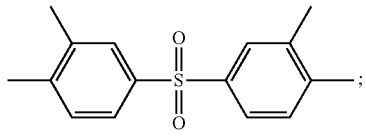
[Chemical Formula A27]
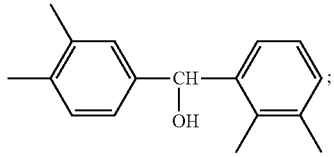
[Chemical Formula A28]
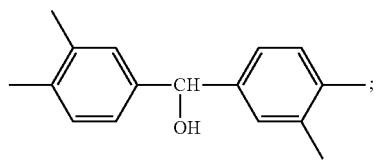
[Chemical Formula A29]
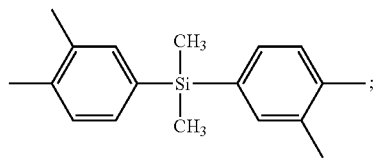
[Chemical Formula A30]
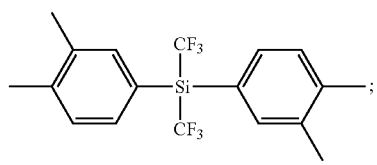
[Chemical Formula A31]
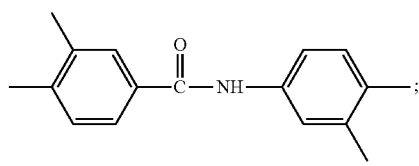
[Chemical Formula A32]
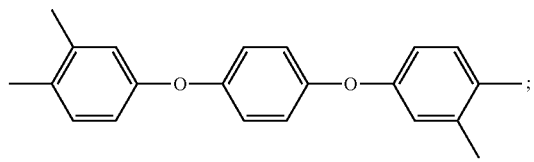
[Chemical Formula A33]
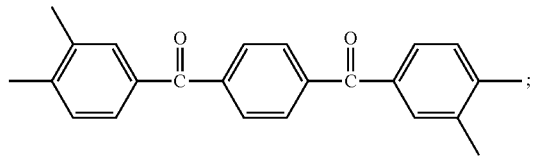
[Chemical Formula A34]
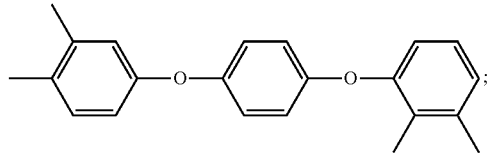
[Chemical Formula A35]
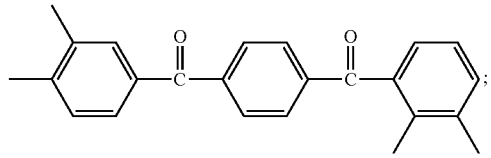

[Chemical Formula A36]
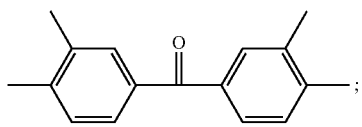

[Chemical Formula A37]
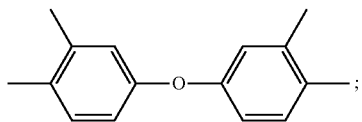

[Chemical Formula A38]
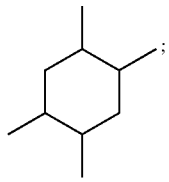

[Chemical Formula A39]
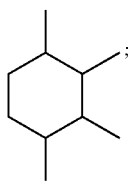

[Chemical Formula A40]
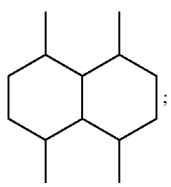

[Chemical Formula A41]
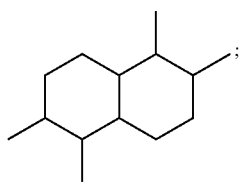

[Chemical Formula A42]
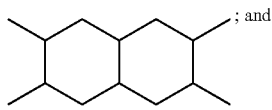

[Chemical Formula A43]
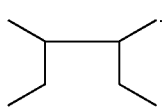

[Chemical Formula B1]
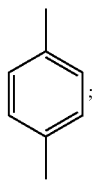

[Chemical Formula B2]
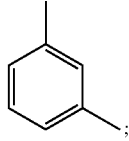

[Chemical Formula B3]
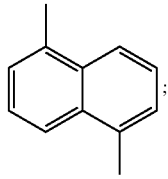

[Chemical Formula B4]
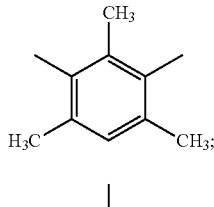

[Chemical Formula B5]
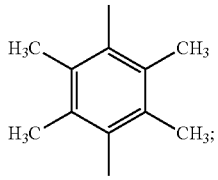

[Chemical Formula B6]
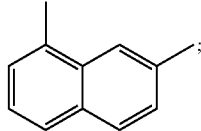

[Chemical Formula B7]
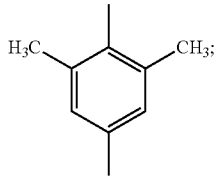

[Chemical Formula B8]
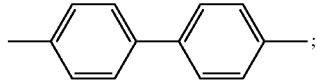

[Chemical Formula B9]
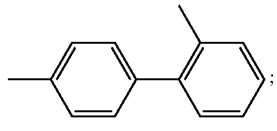

[Chemical Formula B10]
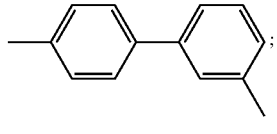

Specifically, in the Chemical Formulae 1 and 2, $R_2$, $R_6$ and $R_8$ may be selected from the group consisting of following Chemical Formulae B1 to B74.

-continued

[Chemical Formula B11]

[Chemical Formula B12]

[Chemical Formula B13]

[Chemical Formula B14]

[Chemical Formula B15]

[Chemical Formula B16]

[Chemical Formula B17]

[Chemical Formula B18]

[Chemical Formula B19]

[Chemical Formula B20]

[Chemical Formula B21]

[Chemical Formula B22]

-continued

[Chemical Formula B23]

[Chemical Formula B24]

[Chemical Formula B25]

[Chemical Formula B26]

[Chemical Formula B27]

[Chemical Formula B28]

[Chemical Formula B29]

[Chemical Formula B30]

[Chemical Formula B31]

[Chemical Formula B32]

[Chemical Formula B33]

[Chemical Formula B34]

[Chemical Formula B35]

[Chemical Formula B36]

[Chemical Formula B37]

[Chemical Formula B38]

[Chemical Formula B39]

[Chemical Formula B40]

[Chemical Formula B41]

[Chemical Formula B42]

[Chemical Formula B43]

[Chemical Formula B44]

[Chemical Formula B45]

[Chemical Formula B46]

[Chemical Formula B47]

[Chemical Formula B48]

[Chemical Formula B49]

[Chemical Formula B50]

[Chemical Formula B51]

[Chemical Formula B52]

[Chemical Formula B53]

[Chemical Formula B54]

[Chemical Formula B55]

[Chemical Formula B56]

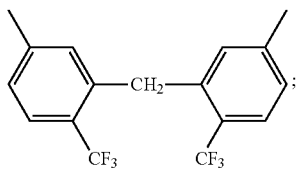

[Chemical Formula B57]

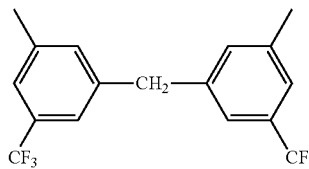

[Chemical Formula B58]

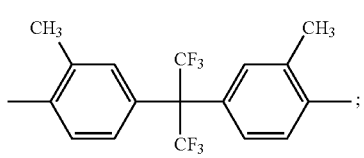

[Chemical Formula B59]

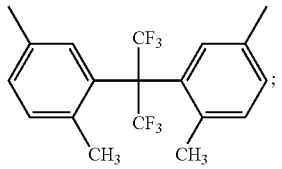

[Chemical Formula B60]

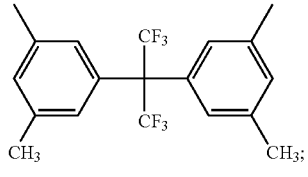

[Chemical Formula B61]

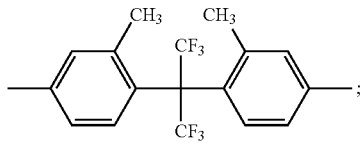

[Chemical Formula B62]

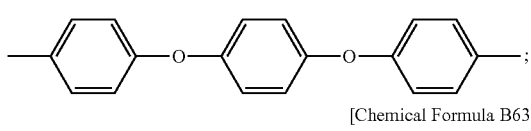

[Chemical Formula B63]

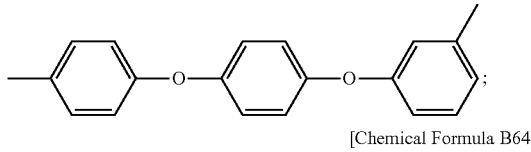

[Chemical Formula B64]

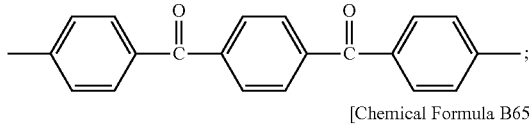

[Chemical Formula B65]

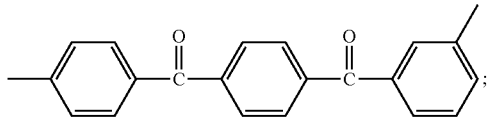

[Chemical Formula B66]

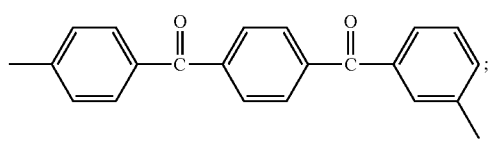

[Chemical Formula B67]

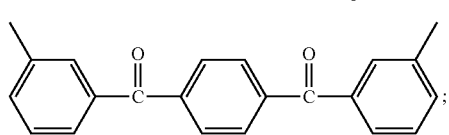

[Chemical Formula B68]

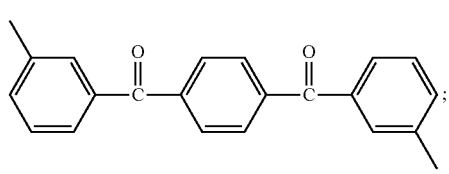

[Chemical Formula B69]

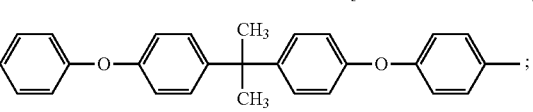

[Chemical Formula B70]

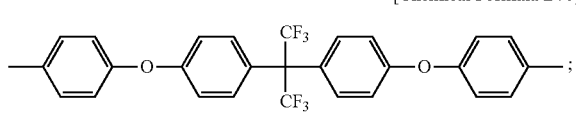

[Chemical Formula B71]

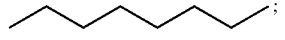

[Chemical Formula B72]

[Chemical Formula B73]

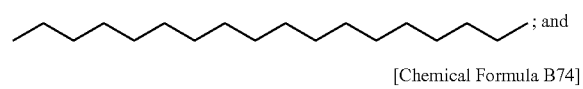

; and

[Chemical Formula B74]

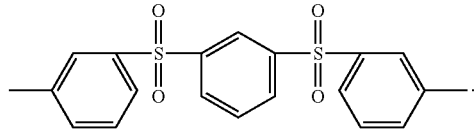

.

According to another exemplary embodiment of the present invention, the polyamic acid may contain one or more sulfone groups and/or one or more trifluoromethyl groups in the molecule. In case of the polyamic acid containing one or more sulfone groups and/or one or more trifluoromethyl groups in the molecule, its solubility in the low boiling point solvent may be increased.

Specifically, the polyamic acid represented by any one of following Chemical Formulae 5 to 7 may be used.

[Chemical Formula 5]

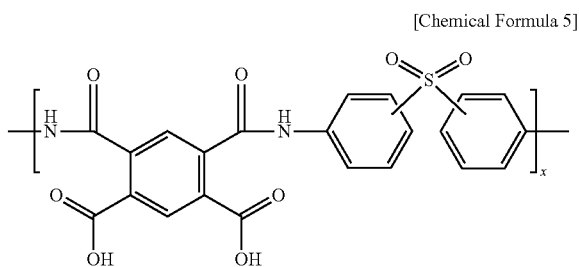

wherein x is an integer of 30 to 10,000, for example, an integer of 100 to 1,000, and for example, an integer of 150 to 500.

[Chemical Formula 6]

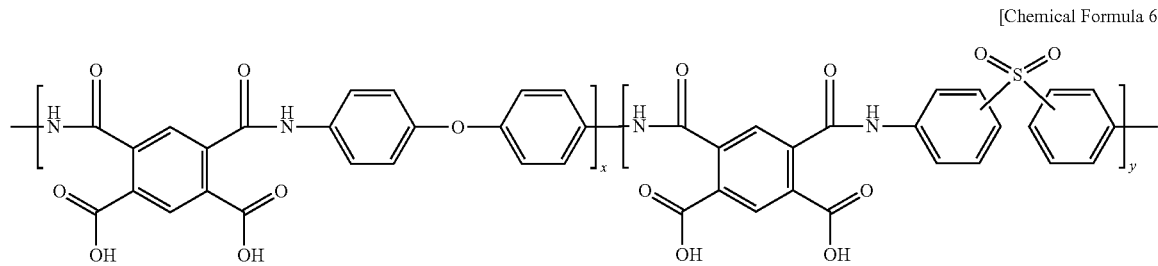

wherein x and y are an integer of 15 to 5,000, respectively, for example, an integer of 25 to 500, and for example, an integer of 50 to 250.

The Chemical Formula 6 represents a repeating structure of an amic acid unit (x) without a sulfone group, and an amic acid unit (y) containing one or more sulfonic groups, wherein the ratio x:y is 1:9 to 5:5. Within the range of the ratio, the polyamic acid solubility in the low boiling point solvent (e.g., acetone) may be increased.

[Chemical Formula 7]

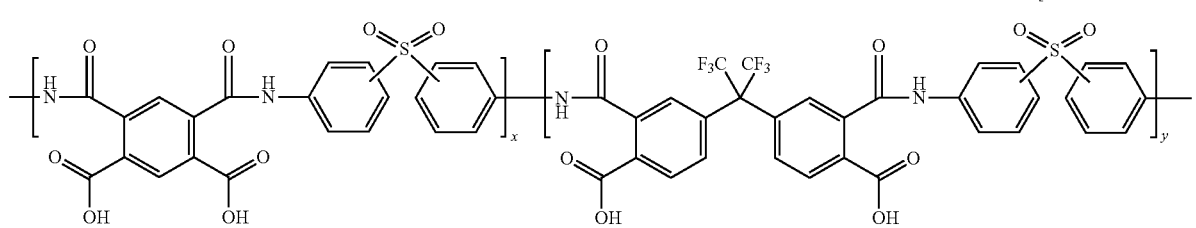

wherein x and y are an integer of 15 to 5,000, respectively, for example, an integer of 50 to 500, and for example, an integer of 75 to 250.

The Chemical Formula 7 represents a repeating structure of an amic acid unit (x) containing one or more sulfone groups but without a trifluoromethyl group, and an amic acid unit (y) containing both one or more sulfonic groups and one or more trifluoromethyl groups, wherein the ratio x:y is 9:1 to 5:5. The polyamic acid within the range of the ratio may have not too high solubility in an electrolyte solution and the like, and only sufficiently high solubility in the low boiling point solvent.

In the Chemical Formulae 5 to 7, the sulfone group may be a substituent in an ortho-, meta- or para-position to an amine group, for example, in a meta-position. In case where the sulfone group is a substituent in the meta-position, polyamic acid solubility in the low boiling point solvent may be increased.

The polyamic acid according to exemplary embodiments of the present invention may have a weight average molecular weight (Mw) of 50,000 to 130,000. In case of having the molecular weight range, it may have increased solubility in the low boiling point solvent, and improved thermal resistance.

The polyamic acid of the Chemical Formula 1 may be prepared by a method known in the art to react an anhydride containing $R_1$ with diamine containing $R_2$. The polyamic acid of the Chemical Formula 2 may be prepared by a method known in the art to react an anhydride containing $R_5$ with diamine containing $R_6$, or an anhydride containing $R_7$ with diamine containing $R_8$.

The non-limiting example of the anhydride containing $R_1$, $R_5$ or $R_7$ may include pyromellitic dianhydride, 4,4'-(hexafluoroisopropylidene)diphthalic dianhydride, 3,3',4,4'-benzophenonetetracarboxylic dianhydride, 4,4'-carbonyldiphthalic dianhydride, 1,2,3,4-butanetetracarboxylic dianhydride, 4,4'-oxydiphthalic dianhydride, 3,3',4,4'-biphenyltetracarboxylic dianhydride, bicyclo[2.2.2]oct-7-ene-2,3,5,6-tetracarboxylic dianhydride, 3,3',4,4'-diphenylsulfonetetracarboxylic dianhydride, 4,4'-isopropylidenediphthalic dianhydride, 1,2,4,5-cyclohexanetetracarboxylic dianhydride, 1,2,3,4-cyclopentanetetracarboxylic dianhydride, or the like.

The non-limiting example of the diamine containing $R_2$, $R_6$ or $R_8$ may include 3,3'-diaminodiphenylsulfone, 4,4'-diaminodiphenyl sulfone, 1,6-hexamethylenediamine, 4,4'-oxydianiline, 4,4'-methylenedianiline, 1,3-phenylenediamine, 1,4-phenylenediamine, 2,2-bis(3-amino-4-methylphenyl)hexafluoropropane, meta-xylenediamine, para-xylenediamine, 3,3'-(hexafluoroisopropylidene)dianiline, 4,4'-(hexafluoroisopropylidene)dianiline), 3-[3-(3-aminophenyl)sulfonylphenyl]sulfonylaniline, 2,2'-bis(trifluoromethyl)benzidine, 1,16-hexadecanediamine, 1,4-cyclohexyldiamine, 3,3'-bis(trifluoromethyl)benzidine, ortho-tolidine, 2,3,5,6-tetramethyl-1,4-phenylenediamine, 2,5-dimethyl-1,4-phenylenediamine, 4,4'-diamino-3,3'-dimethyldiphenylmethane, 2,2-bis[4-(4-aminophenoxy)phenyl]hexafluoropropane, or the like.

The polyamic acid having the structure of the Chemical Formula 1 or 2 may represent adequate solubility in the low boiling point solvent (the solvent having a boiling point less than 150° C.)

Specifically, if an organic binder component of the separator coating agent has low solubility in the low boiling point solvent, the preparation of the coating agent usable in a general coating method itself may be difficult, and on the contrary, if it has unduly high solubility in the low boiling point solvent, battery safety may be rather decreased due to the risk of dissolving the separator in the electrolyte solution of a battery.

Thus, according to one exemplary embodiment of the present invention, there is provided a coating composition having adequately controlled solubility in the low boiling point solvent by using the polyamic acid having the structure of the Chemical Formula 1 or 2.

The polyamic acid used in the present invention may be contained in 1 to 30% by weight, more specifically 1 to 20% by weight, and for example, 1 to 15% by weight, based on the weight of the coating composition. Within the range, the polyamic acid may sufficiently serve as an organic binder component of the coating agent, and sufficiently impart high thermal resistance to the coating composition.

The low boiling point solvent used in the present invention refers to a solvent having a boiling point less than 150° C. The non-limiting examples of the low boiling point solvent usable in the present invention may include acetone, tetrahydrofuran (THF), and the like. These may be used alone or in a mixture of two or more, and for example, acetone may be used. Since acetone has a significantly low boiling point of about 56.5° C., if it is used as a solvent of a coating agent, the coating layer may be easily dried, so that the air permeability of the separator becomes excellent, and also deterioration of the physical properties due to the residual solvent may be prevented.

According to one exemplary embodiment of the present invention, additionally to the low boiling point solvent, a high boiling point solvent may be used together as the solvent of the coating composition.

The high boiling point solvent usable in the present invention refers to a solvent having a boiling point of 150° C. or more. The non-limiting example of the high boiling point solvent usable in the present invention may include dimethylformamide (DMF), dimethylsulfoxide (DMSO), dimethylacetamide (DMAc), dimethylcarbonate (DMC), N-methylpyrrolidone (NMP), or the like. These may be used alone or in a mixture of two or more.

As to the contents of the low boiling point solvent and the high boiling point solvent, the weight ratio of the low boiling point solvent (X) to the high boiling point solvent (Y) (X:Y) may be 9.5:0.5 to 5:5, specifically 9.0:1.0 to 5:5, more specifically 8:2 to 5:5.

In case of adjusting the content ratio of the low boiling point solvent and the high boiling point solvent to the above range, the polyamic acid may be sufficiently dissolved to facilitate the preparation of the coating agent, and the coating layer formed on the substrate film may also be easily dried. That is, the solvent may remain in a small amount in the dried coating layer of the separator (for example, 500 ppm or less), so that the air permeability of the separator will not be decreased.

The total content of the solvent including the low boiling point solvent and the high boiling point solvent may be 20 to 99% by weight, specifically 50 to 95% by weight, and more specifically 70 to 95% by weight, based on the weight of the coating composition. If the solvent is contained within the range, the coating agent may be easily prepared, and the drying process of the coating layer may be performed well.

The inorganic particles used in the present invention are not specifically limited, and any inorganic particles generally used in the art may be used. The non-limiting examples of the inorganic particles usable in the present invention include $Al_2O_3$, $SiO_2$, $B_2O_3$, $Ga_2O_3$, $TiO_2$, $SnO_2$ or the like. These may be used alone or in a mixture of two or more. The inorganic particles used in the present invention may be, for example, $Al_2O_3$ (alumina).

The size of the inorganic particle used in the present invention is not specifically limited, and the average particle diameter may be 1 to 2,000 nm, or 100 to 1,000 nm. In case of using the inorganic particles within the size range, dispersibility and coating processability of the inorganic particles in a coating solution may be prevented from being reduced, and the thickness of the coating layer may be appropriately adjusted to prevent mechanical property deterioration and increase in electric resistance. Further, the size of the pores produced in the separator may be appropriately adjusted to lower a probability of causing an internal short-circuit upon charging and discharging a battery.

In the preparation of the coating composition, the inorganic particles may be used in the form of an inorganic dispersion being dispersed in an appropriate solvent. The appropriate solvent is not specifically limited, and any solvent generally used in the art may be used. As an appropriate solvent to disperse the inorganic particles, acetone may be used, for example.

The inorganic dispersion may be prepared by a general method without a special limitation, and for example, in a manner of adding $Al_2O_3$ in a proper amount to acetone, and milling it to be dispersed with a beads mill.

In the preparation of the inorganic dispersion, the content of the inorganic particles may be 10 to 40% by weight, specifically 20 to 30% by weight, based on the weight of the dispersion. If the inorganic particles are contained within the range, their heat dissipation property may be sufficiently exhibited, and the separator coated using them may have effectively suppressed thermal shrinkage.

The content of the inorganic dispersion may be 10 to 70% by weight, specifically 20 to 60% by weight, and more specifically 30 to 50% by weight, based on the weight of the coating composition of the present invention. Within the range, the inorganic particles may be expected to show a sufficient heat dissipation property, and the content of an organic binder is also relatively properly adjusted, and thus, the adhesion of the separator may be secured above a certain level.

According to an exemplary embodiment of the present invention, the coating composition may further include a binder in addition to the polyamic acid. The binder may be one selected from the group consisting of polyvinylidene fluoride (PVdF) homopolymer, polyvinylidene fluoride-hexafluoropropylene copolymer (PVdF-HFP), polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and acrylonitrilestyrene-butadiene copolymer, alone or in a mixture thereof. Specifically, polyvinylidene fluoride homopolymer and/or polyvinylidene fluoride-hexafluoropropylene copolymer may be included.

In case of further including polyvinylidene fluoride homopolymer, the viscosity and adhesion of the coating composition may be improved to assist the inorganic particles to be uniformly dispersed, and also, a coating layer having high adhesion may be formed on a substrate film to increase the stability of the separator. The weight average molecular weight of the polyvinylidene fluoride homopolymer usable in the present invention may be 1,000,000 g/mol or more, or for example, 1,000,000 to 1,200,000 g/mol, but not specifically limited thereto. Within the molecular weight range, the adhesion between the coating layer and the polyolefin-based substrate film may be enhanced, so that the heat-sensitive polyolefin-based substrate film may be effectively prevented from shrinking by heat, and additionally, the adhesion between the coating layer and an electrode may also be improved to prevent the short-circuit of a cathode and an anode. Further, in case of using the polyvinylidene fluoride homopolymer within the molecular weight range, the polyvinylidene fluoride homopolymer may be dissolve well even with a small amount of DMF, thereby facilitating the drying of the coating layer.

Further, for example, in case of coating the separator with a coating agent further containing polyvinylidene fluoride-hexafluoropropylene copolymer, the electrolyte impregnation property of the separator may be improved to produce a battery having excellent electrical output. The weight average molecular weight of the polyvinylidene fluoride-hexafluoropropylene copolymer usable in the present invention may be 800,000 g/mol or less, or for example, 600,000 to 800,000 g/mol, but not specifically limited thereto. In case of using the polyvinylidene fluoride-hexafluoropropylene copolymer within the molecular weight range, a separator having a sufficiently improved electrolyte impregnation property may be prepared, and using the separator, a battery efficiently generating electrical output may be produced.

In the polyvinylidene fluoride-hexafluoropropylene copolymer used in the present invention, each content of the polyvinylidene fluoride and hexafluoropropylene is not specifically limited, but the hexafluoropropylene may be contained in 0.1 to 40% by weight, based on the total weight of the copolymer.

The method of preparing a coated separator according to one exemplary embodiment of the present invention may include applying a coating composition containing polyamic acid, a low boiling point solvent, and a high boiling point solvent on one or both surfaces of a polyolefin-based substrate film, and drying it to form a coating layer.

The preparation of a coating composition containing polyamic acid, a low boiling point solvent, and a high boiling point solvent in the present invention may include mixing 1 to 30% by weight of the polyamic acid, based on the total weight of the coating composition, with 70 to 99% by weight of the low boiling point solvent and the high boiling point solvent, based on the total solvent, and stirring it at 10 to 40° C. for 30 minutes to 5 hours.

The coating composition may further include inorganic particles. Therefore, the preparation of the coating composition may include mixing the polyamic acid, the low boiling point solvent, the high boiling point solvent, and the inorganic particles, and stirring it at 10 to 40° C. for 30 minutes to 5 hours. Herein, the content of the inorganic particles may be 10 to 40% by weight, based on the total weight of the coating composition.

Alternatively, the coating composition may be prepared by dispersing the inorganic particles in a dispersion medium to prepare an inorganic dispersion, and mixing it with a high molecular solution containing the polyamic acid, the low boiling point solvent and the high boiling point solvent. In case of separately preparing the inorganic dispersion as such, the dispersion property and solution stability of the inorganic particles and the polyamic acid may be improved. Therefore, in another embodiment, the coating composition of the present invention may be prepared by mixing the polyamic acid component and the inorganic particles, each prepared in the state of being dissolved or dispersed in an appropriate solvent.

For example, the coating composition may be prepared in a manner of preparing solutions of polyamic acid, polyvinylidene fluoride homopolymer and/or polyvinylidene fluoride-hexafluoropropylene copolymer each dissolved in an appropriate solvent, and an inorganic dispersion in which inorganic particles are dispersed, respectively, then mixing them with an appropriate solvent.

After mixing the polyamic acid solution, the inorganic dispersion, and the solvent, the mixture may be sufficiently stirred using a ball mill, a beads mill, a screw mixer, or the like to prepare a coating composition in the form of a mixture.

According to another exemplary embodiment of the present invention, there is provided a separator coated with the coating composition on one or both surfaces of the polyolefin-based substrate film.

The method to coat the polyolefin-based substrate film with the coating agent is not specifically limited, and any method generally used in the art may be used. The non-limiting example of the coating method may include a dip coating, a die coating, a roll coating, a comma coating method, or the like. These methods may be applied alone or in a combination of two or more. The coating layer of the separator of the present invention may be formed by, for example, a dip coating method.

The coating layer of a mixture of organic and inorganic materials of the present invention may have a thickness of 0.01 to 20 μm, specifically 1 to 15 μm. Within the thickness range, the coating layer may be formed to have an adequate thickness to obtain excellent thermal stability and adhesion, and the separator may be prevented from being unduly thick entirely, thereby suppressing an increase of internal resistance of a battery.

The coating layer may be dried by warm air, hot air or low humidity air, or vacuum dried, or dried by irradiating far-infrared radiation, electron beam or the like in the present invention. In addition, the drying temperature depends on the kind of solvent, but may be generally 60 to 120° C. The drying time also depends on the kind of the solvent, but may be generally 1 minute to 1 hour. In a specific example, the drying may be carried out at 90 to 120° C. for 1 to 30 minutes, or 1 to 10 minutes In the present invention, the solvent may be effectively removed even under a condition of reduced drying time and lower drying temperature as the above by using the polyamic acid having excellent solubility in the low boiling point solvent as a coating composition component.

After drying, the residual amount of the low boiling point solvent and the high boiling point solvent in the coated separator may be 500 ppm or less. Specifically, the residual amount of the low boiling point solvent and the high boiling point solvent in the coated separator may be 400 ppm or less. For example, after drying, the low boiling point solvent may not remain, and the high boiling point solvent may remain in 500 ppm or less in the coating layer.

It is preferred that the substrate film used in the separator of the present invention is polyolefin-based. The non-limiting example of the polyolefin-based substrate film may include a polyethylene substrate film, a polypropylene substrate film, or the like.

In case of the separator for a secondary battery, a substrate film having a shutdown function is preferred, and the polyolefin-based substrate film used in the separator of the present invention corresponds to the substrate film having an excellent shut down function.

The polyolefin-based substrate film used in the present invention may be selected from the group consisting of for example, a single polyethylene membrane, a single polypropylene membrane, a double-layered polyethylene/polypropylene membrane, a triple-layered polypropylene/polyethylene/polypropylene membrane, and a triple-layered polyethylene/polypropylene/polyethylene membrane.

The polyolefin-based substrate film may have a thickness of 1 to 40 μm, more specifically 1 to 30 μm, and still more specifically 1 to 20 μm. In case of using the substrate film within the thickness range, the prepared separator may have an adequate thickness which is enough to prevent a short-circuit of a cathode and an anode of a battery, but not enough to increase the internal resistance of a battery.

The polyamic acid of the present invention is not imidated in the coating layer, and may be present in the form of polyamic acid.

The residual amount of the organic solvent in the dried coating layer of the separator of the present invention may be 500 ppm or less. The organic solvent residual amount refers to a sum of the residual amounts of the low boiling point solvent and the high boiling point solvent, if both solvents are used.

The solvent residual amount in the dried coating layer of 500 ppm or less in the present invention does not numerically include a value less than zero, and technically refers to a positive (+) value of 0 to 500 ppm.

The dried coating layer of the separator of the present invention refers to a coating layer dried by the drying process at 70 to 120° C., specifically 100 to 120° C. for 1 to 20 minutes, or 1 to 10 minutes, more specifically 1 to 2 minutes, after coating the coating agent on the polyolefin-based substrate film.

In case where the solvent residual amount in the dried coating layer of the separator is 500 ppm or less, the followings may be prevented: a problem caused by an excessive amount of the solvent remaining in the coating layer, that is, an organic binder component not representing sufficient adhesion, and a problem of not effectively suppressing the thermal shrinkage of the substrate film due to reduced adhesion of the coating layer, which accordingly functions as a factor hindering battery performance upon charging/discharging a battery which causes the short-circuit of an electrode when a battery overheats.

The organic solvent remaining in the dried coating layer of the present invention may have a boiling point higher than the melting point of the substrate film of the present invention.

The separator coated with the polyamic acid of the present invention may have, after being left at 200° C. for 1 hour, thermal shrinkage in a machine direction (MD) or a transverse direction (TD) of 20% or less, specifically 10% or less, more specifically 5% or less, respectively. The thermal shrinkage may be 5% or less, for example. Within the range, the short-circuit of an electrode may be effectively prevented to improve the safety of a battery.

The separator coated with the polyamic acid of the present invention may have, after being left at 150° C. for 1 hour, thermal shrinkage in a machine direction (MD) or a transverse direction (TD) of 15% or less, specifically 13% or less, more specifically 10% or less, respectively. The thermal shrinkage may be 5% or less, for example. Within the range, the short-circuit of an electrode may be effectively prevented to improve the safety of a battery.

The method to measure the thermal shrinkage of the separator is not specifically limited, and any method generally used in the art may be used.

The non-limiting example of the method of measuring the thermal shrinkage of the separator is as follows: After a prepared separator is cut into a size of about 5 cm (MD) x about 5 cm (TD), and stored in a chamber at 200° C. for 1 hour, the shrinkage in MD and TD directions of the separator is measured to calculate the thermal shrinkage.

The thermal shrinkage at 150° C. may be measured in the same manner as the above method, except that the chamber at 200° C. is replaced with the chamber at 150° C.

The separator of the present invention may have thermal resistance temperature of 200° C. or more. If the separator has the thermal resistance temperature of 200° C. or more, an electrode short-circuit phenomenon by heat may be effectively suppressed, thereby manufacturing a battery having high thermal safety. 'Thermal resistance temperature' used herein, refers to temperature to which when the separator is exposed for 10 minutes, the shrinkage of the separator in MD/TD directions is less than 5%.

According to another exemplary embodiment of the present invention, there is provided an electrochemical battery including a porous polyolefin-based separator containing the coating layer of a mixture of organic and inorganic materials, and a cathode and an anode, and filled with electrolyte.

The kind of the electrochemical battery is not specifically limited, and may be any kind known to the art.

The electrochemical battery of the present invention may be, specifically, a lithium secondary battery such as a lithium metal secondary battery, a lithium ion secondary battery, a lithium polymer secondary batter, a lithium ion polymer secondary battery, or the like.

The method of manufacturing the electrochemical battery of the present invention is not specifically limited, and any method generally used in the art may be used.

The non-limiting example of the method of manufacturing the electrochemical battery is as follows: The battery may be manufactured in a manner of disposing the polyolefin-based separator including the coating layer of a mixture of organic and inorganic materials between a cathode and an anode of the battery, and then filling it with an electrolyte solution.

The electrode forming the electrochemical battery of the present invention may be prepared in the form of binding an electrode active material to an electrode current collector by a method generally used in the art.

The cathode active material of the electrode active material used in the present invention is not specifically limited, and any cathode active material generally used in the art may be used.

The non-limiting example of the cathode active material may include lithium manganese oxide, lithium cobalt oxide, lithium nickel oxide, lithium iron oxide, a lithium complex oxide combining those oxides, or the like.

The anode active material of the electrode active material used in the present invention is not specifically limited, and any anode active material generally used in the art may be used.

The non-limiting example of the anode active material may include a lithium adsorption material such as a lithium metal or lithium alloy, carbon, petroleum coke, activated carbon, graphite, or other carbons.

The electrode current collector used in the present invention is not specifically limited, and any electrode current collector generally used in the art may be used.

The non-limiting example of the materials of the cathode current collector of the electrode current collector may include foil prepared from aluminum, nickel or a combination thereof, or the like.

The non-limiting example of the materials of the anode current collector of the electrode current collector may include foil prepared from copper, gold, nickel, a copper alloy or a combination thereof, or the like.

The electrolyte solution used in the present invention is not specifically limited, and any electrolyte for an electrochemical battery generally used in the art may be used.

The electrolyte solution may be one wherein a salt having a structure such as $A^+B^-$ is dissolved or dissociated in an organic solvent.

The non-limiting example of $A^+$ may include a cation selected from the group consisting of an alkali metal cation such as $Li^+$, $Na^+$ or $K^+$, or a combination thereof.

The non-limiting example of $B^-$ may include an anion selected from the group consisting of an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ or $C(CF_2SO_2)_3^-$, or a combination thereof.

The non-limiting example of the organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethylcarbonate (EMC), γ-butyrolactone, or the like. These may be used alone or in a mixture of two or more.

Hereinafter, the present invention is described in more detail, by describing the following Examples, Comparative Examples, and Experimental Examples. However, the Examples, Comparative Examples, and Experimental Examples are only illustrative of the present invention, and the disclosure of the present invention is not construed as being limited thereto.

Examples 1 to 17

Preparation of Separator Having a Coating Layer Containing Polyamic Acid Formed Thereon

Example 1

(1) Preparation of Coating Composition

In order to prepare a polyamic acid solution, 0.5 mol of 3,3'-diamino diphenyl sulfone and N,N-dimethylacetamide (DMAc) were placed in a three-neck flask, and dissolved with stirring. Next, 0.5 mol of pyromellitic dianhydride in a solid state was added to the solution, and the solution was vigorously stirred. Herein, the solid content by mass ratio was 20% by weight, and the reaction proceeded for 24 hours while maintaining the temperature less than 25° C. to prepare a polyamic acid solution.

In order to prepare an inorganic dispersion, 25% by weight of $Al_2O_3$ (LS235, Nippon Light Metal Company, Ltd.) was added to acetone (Daejung Chemical & Metals Co., Ltd.), and milled at 25° C. for 3 hours using a beads mill to be dispersed, thereby preparing an inorganic dispersion.

The thus prepared, polyamic acid solution and inorganic dispersion were mixed in a weight ratio of polyamic acid solution:N,N-dimethylacetamide (DMAc):inorganic dispersion:acetone=0.9:1.1:4.1:4, and stirred at 25° C. for 2 hours with a power mixer to prepare a coating composition.

(2) Preparation of Separator

The above prepared coating agent was coated on both surfaces of the single polyethylene substrate film having a thickness of 14 μm in a manner of dip coating, and then dried at 110° C. for about 1 minute to prepare a separator.

Example 2

The separator was prepared by the same method as in above Example 1, except that 1,6-hexamethylenediamine was placed in the three-neck flask instead of 3,3'-diaminodiphenylsulfone, in the preparation of the coating composition.

Example 3

The separator was prepared by the same method as in above Example 1, except that 4,4'-oxydianiline was placed in the three-neck flask instead of 3,3'-diaminodiphenylsulfone, the solid content of the polyamic acid solution by mass ratio was 10% by weight, and the mixing was carried out in a weight ratio of the prepared polyamic acid solution:N,N-dimethylacetamide (DMAc):inorganic dispersion:acetone=0.9:2.8:4.1:2.2, in the preparation of the coating composition.

Example 4

The separator was prepared by the same method as in above Example 1, except that 0.2 mol of 4,4'-oxydianiline and 0.3 mol of 3,3'-diaminodiphenylsulfone were placed in the three-neck flask instead of 0.5 mol of 3,3'-diaminodiphenylsulfone, and the mixing was carried out in a weight ratio of the prepared polyamic acid solution:N,N-dimethylacetamide (DMAc):inorganic dispersion:acetone 0.9:1.5:4.1:3.5, in the preparation of the coating composition.

Example 5

The separator was prepared by the same method as in above Example 1, except that 4,4'-diaminodiphenylsulfone was placed in the three-neck flask instead of 3,3-diaminodiphenylsulfone, in the preparation of the coating composition.

Example 6

The separator was prepared by the same method as in above Example 1, except that 0.375 mol of pyromellitic dianhydride and 0.125 mol of 4,4'-(hexafluoroisopropylidene)diphthalic dianhydride were used instead of 0.5 mol of pyromellitic dianhydride, and the mixing was carried out in a weight ratio of the prepared polyamic acid solution:N,N-dimethylacetamide (DMAc):inorganic dispersion:acetone=0.9:0.3:4.1:4.7, in the preparation of the coating composition.

Example 7

The separator was prepared by the same method as in above Example 1, except that polyvinylidene fluoride homopolymer (hereinafter, referred to as 'PVdF homopolymer') solution was further included, and the mixing was carried out in a weight ratio of the prepared polyamic acid solution:PVdF homopolymer solution:N,N-dimethylacetamide (DMAc):inorganic dispersion:acetone=0.5:0.7:0.7:4.1:4.0, in the preparation of the coating agent.

The PVdF homopolymer solution was prepared by adding 10% by weight of PVdF homopolymer (5130, Solvay) to DMF (Daejung Chemical & Metals Co., Ltd.), and stirring it at 25° C. for 4 hours using a stirrer.

Example 8

The separator was prepared by the same method as in above Example 1, except that polyvinylidene fluoride-hexafluoropropylene copolymer (hereinafter, referred to as 'PVdF-HFP copolymer') solution was further included, and the mixing was carried out in a weight ratio of the prepared polyamic acid solution:PVdF-HFP copolymer solution:N,N-dimethylacetamide (DMAc):inorganic dispersion:acetone=0.5:0.7:1.4:4.1:3.3, in the preparation of the coating agent.

The PVdF-HFP copolymer solution was prepared by adding 10% by weight of PVdF-HFP copolymer (21216, Solvay) having a weight average molecular weight of 700,000 g/mol to acetone (Daejung Chemical & Metals Co., Ltd.), and stirring it at 25° C. for 4 hours using a stirrer.

Example 9

The separator was prepared by the same method as in above Example 1, except that 1,2,3,4-butanetetracarboxylic dianhydride was used instead of pyromellitic dianhydride, in the preparation of the coating agent.

Example 10

The separator was prepared by the same method as in above Example 1, except that 1,2,4,5-cyclohexanetetracarboxylic dianhydride was used instead of pyromellitic dianhydride, in the preparation of the coating agent.

Example 11

The separator was prepared by the same method as in above Example 1, except that 4,4'-carbonyldiphthalic dianhydride was used instead of pyromellitic dianhydride, in the preparation of the coating agent.

Example 12

The separator was prepared by the same method as in above Example 1, except that 4,4'-(hexafluoroisopropylidene)diphthalic dianhydride, and 1,16-hexadecanediamine were used instead of pyromellitic dianhydride, and 3,3'-diamino diphenyl sulfone, in the preparation of the coating agent.

Example 13

The separator was prepared by the same method as in above Example 1, except that 4,4'-(hexafluoroisopropylidene)diphthalic dianhydride, and 1,4-cyclohexyldiamine were used instead of pyromellitic dianhydride, and 3,3'-diamino diphenyl sulfone, respectively, in the preparation of the coating agent.

Example 14

The separator was prepared by the same method as in above Example 6, except that 4,4'-diamino diphenyl sulfone was used instead of 3,3'-diamino diphenyl sulfone, in the preparation of the coating agent.

Example 15

The separator was prepared by the same method as in above Example 6, except that 1,2,4,5-cyclohexanetetracarboxylic dianhydride was used instead of pyromellitic dianhydride, in the preparation of the coating agent.

Example 16

The separator was prepared by the same method as in above Example 6, except that 4,4'-isopropylidenediphthalic dianhydride was used instead of 4,4'-(hexafluoroisopropylidene)diphthalic dianhydride, in the preparation of the coating agent.

Example 17

The separator was prepared by the same method as in above Example 1, except that 3-[3-(3-aminophenyl)sulfonylphenyl]sulfonylaniline was used instead of 3,3'-diaminodiphenyl sulfone, and 0.375 mol of pyromellitic dianhydride and 0.125 mol of 4,4'-(hexafluoroisopropylidene)diphthalic dianhydride were used instead of 0.5 mol of pyromellitic dianhydride, in the preparation of the coating agent.

Comparative Examples 1 and 2

Preparation of separator having a coating layer not containing polyamic acid formed thereon Comparative Example 1

A coating agent prepared by mixing in a weight ratio of the PVdF-HFP copolymer solution of Example 8:the inorganic dispersion of Example 1:acetone=2:4.8:3.2, and stirring it at 25° C. for 2 hours with a power mixer, was coated on both surfaces of a single polyethylene substrate film having a thickness of 14 μm in a manner of dip coating, and dried to prepare the separator.

Comparative Example 2

The separator was prepared in the same method as in Comparative Example 1, except that the PVdF homopolymer solution of Example 7 was used instead of the PVdF-HFP copolymer solution.

TABLE 1

| | Polyamic acid | Molecular weight |
|---|---|---|
| Example 1 | | 40,000~60,000 |
| Example 2 | | 60,000~80,000 |
| Example 3 | | 90,000~110,000 |
| Example 4 | | 80,000~100,000 x:y = 4:6 |
| Example 5 | | 60,000~80,000 |
| Example 6 | | 60,000~80,000 x:y = 7.5:2.5 |
| Example 7 | | 40,000~60,000 |

TABLE 1-continued
| | Polyamic acid | Molecular weight |
|---|---|---|
| Example 8 | 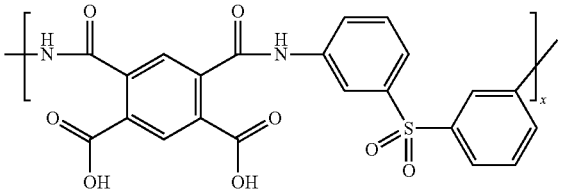 | 40,000~60,000 |
TABLE 2
| | Polyamic acid | Molecular weight |
|---|---|---|
| Example 9 | 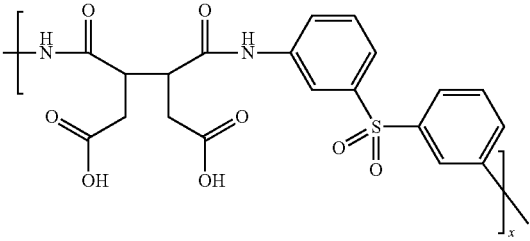 | 40,000~60,000 |
| Example 10 | 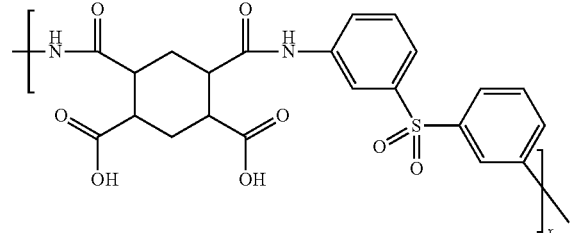 | 50,000~70,000 |
| Example 11 | 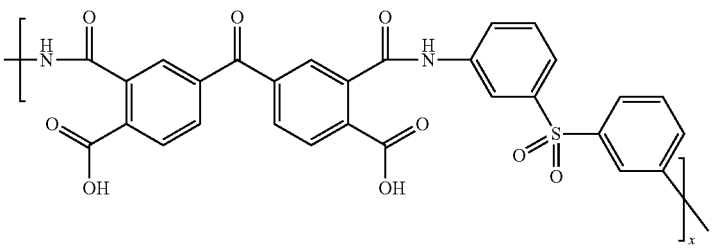 | 60,000~80,000 |
| Example 12 | 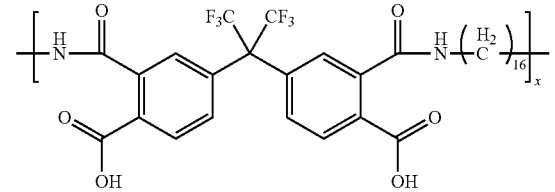 | 40,000~60,000 |
| Example 13 | 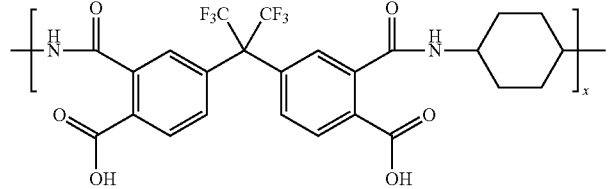 | 60,000~80,000 |

TABLE 2-continued

| | Polyamic acid | Molecular weight |
|---|---|---|
| Example 14 | [structure] | 70,000~90,000 x:y = 7.5:2.5 |
| Example 15 | [structure] | 70,000~90,000 x:y = 7.5:2.5 |
| Example 16 | [structure] | 60,000~80,000 x:y = 7.5:2.5 |
| Example 17 | [structure] | 70,000~90,000 x:y = 7.5:2.5 |

Experimental Example 1

Measurement of Thickness and Coated Weight of Coating Layer

The following method was carried out in order to measure the thicknesses and the coated weights of the coating layers prepared in above Examples 1 to 17, and Comparative Examples 1 and 2.

First, the thickness of each coating layer was measured using a SEM cross section image of each coating layer and micro calipers. Then, each coating layer was cut into a size of 10 cm (MD)×20 cm (TD) and its weight was measured with an electronic scale to calculate the coated weight. The results of measuring the thicknesses and the coated weights are shown in the following Table 4.

Experimental Example 2

Measurement of Thermal Shrinkage of Separator

The following method was carried out in order to measure the thermal shrinkage of the separators prepared in above Examples 1 to 17, and Comparative Examples 1 and 2.

Each separator prepared according to the above Examples and Comparative Examples was cut into a size of 5 cm (MD)×5 cm (TD), thereby producing a total of seven samples. Each of the samples was stored in chambers at 150° C. and 200° C. for 1 hr, and then shrinkage amounts in MD and TD directions of each sample were measured to calculate the thermal shrinkage. The results of measuring the thermal shrinkage are shown in the following Table 4.

Experimental Example 3

Electrolyte Solution Wettability of Separator

The following method was carried out in order to measure the electrolyte solution wettability of the separators prepared in above Examples 1 to 17, and Comparative Examples 1 and 2.

Each separator prepared according to the above Examples and Comparative Examples was cut into a square of 3 cm (MD)×3 cm (TD), thereby producing a total of seven samples. After each sample was floated on the surface of an electrolyte solution in a beaker, time to be completely soaked by the electrolyte solution was measured.

The time to be soaked by the electrolyte solution is shown in the following Table 4, and diffusion forms of the electrolyte solution after adding each drop of the electrolyte solution to the separators of Example 1 and Comparative Example 1 at the same time, are shown in FIG. 1.

Experimental Example 4

Measurement of DMAc Solvent Residual Amount in Coating Layer of Separator

In order to measure the organic solvent residual amounts in the coating layers of the dried separators prepared in above Examples 1 to 17, and Comparative Examples 1 and 2, gas chromatography (HP-6890) was performed under conditions described in the following Table 3, and the results are shown in Table 4.

TABLE 3

| Parameters | Conditions |
| --- | --- |
| Column | Front: HP-INNOWax (length 30 M, ID 0.53 mm, film thickness 1.00 μm)<br>Back: HP-1 (length 30 M, ID 0.53 mm, film thickness 0.88 μm) |
| Temperature and time | 40° C. (4 min) →20° C./min → 250° C. (4 min) |
| Flow rate | 10 mL/min |
| Injector | S/SL Injector |
| Split ratio | 5:1 |
| Detector | FID |
| Injection volume | 1 μl |
| Injector temperature | 200° C. |

As shown in the above Table 4, it is confirmed that the separators of Examples 1 to 17 containing polyamic acid in the coating layers have less thermal shrinkage amounts, and also much excellent electrolyte solution wettability, as compared with those of Comparative Examples 1 and 2 not containing polyamic acid. In addition, the separators of the Comparative Examples had broken forms after being left at 200° C. for 1 hour, so that their shrinkage was not measurable.

Further, after a lithium secondary battery was manufactured using the separator according to Example 1, battery capacity change by the use of the battery was observed, and as a result, it was confirmed that a battery capacity was hardly changed even after about 150 cycles (FIG. 2).

Accordingly, it is considered that in case of utilizing the separator of the present invention in an electrochemical battery, thermal stability of the battery may be improved, such that a battery life is extended over a long term.

Further, as a result of measuring solvent residual amounts, acetone was not detected in both separators of the Examples and Comparative Examples, and the high boiling point

TABLE 4

| | Thicknesses of Coating layer (μm) | Coated weights of coating layer (g/m$^2$) | Solvent residual amount (ppm) | Electrolyte solution wettability (sec) | Thermal shrinkage of separator (%) | | | |
| --- | --- | --- | --- | --- | --- | --- | --- | --- |
| | | | | | 150° C., 1 hr | | 200° C., 1 hr | |
| | | | | | TD | MD | TD | MD |
| Example 1 | 6.1 | 7.3 | 120 | 30 | 0.5 | 0.6 | 0.9 | 1.0 |
| Example 2 | 6.6 | 7.5 | 115 | 40 | 0.5 | 0.6 | 0.9 | 1.0 |
| Example 3 | 6.9 | 7.7 | 310 | 45 | 0.3 | 0.5 | 0.8 | 0.9 |
| Example 4 | 6.8 | 7.6 | 180 | 35 | 0.4 | 0.5 | 0.9 | 1.0 |
| Example 5 | 6.4 | 7.6 | 125 | 34 | 0.5 | 0.6 | 1.0 | 1.1 |
| Example 6 | 6.2 | 7.2 | 55 | 31 | 0.5 | 0.7 | 1.1 | 1.3 |
| Example 7 | 8.1 | 8.4 | 80 | 55 | 1.1 | 1.1 | 2.0 | 2.1 |
| Example 8 | 7.8 | 8.1 | 85 | 38 | 1.4 | 1.3 | 2.5 | 3.0 |
| Example 9 | 6.2 | 7.3 | 115 | 35 | 0.7 | 0.5 | 0.9 | 0.8 |
| Example 10 | 6.7 | 7.5 | 120 | 37 | 0.6 | 0.7 | 0.9 | 1.0 |
| Example 11 | 6.5 | 7.4 | 120 | 40 | 0.5 | 0.8 | 0.8 | 1.1 |
| Example 12 | 6.1 | 7.1 | 120 | 41 | 0.6 | 1.0 | 0.9 | 1.2 |
| Example 13 | 6.3 | 7.3 | 115 | 40 | 0.5 | 0.7 | 1.0 | 1.3 |
| Example 14 | 6.0 | 7.0 | 60 | 38 | 1.3 | 1.4 | 2.0 | 2.5 |
| Example 15 | 6.0 | 7.0 | 55 | 37 | 1.4 | 1.5 | 2.5 | 3.5 |
| Example 16 | 6.0 | 7.0 | 60 | 32 | 0.6 | 0.8 | 1.2 | 1.3 |
| Example 17 | 6.0 | 7.0 | 95 | 40 | 1.0 | 1.2 | 1.9 | 2.1 |
| Comparative Example 1 | 8.8 | 8.5 | — | 65 | 21.5 | 26.0 | — | — |
| Comparative Example 2 | 9.0 | 9.0 | — | >300 | 10.0 | 12.5 | — | — | solvent, DMAc was detected to be 500 ppm or less in Examples 1 to 17. Since only acetone was used as a solvent in the Comparative Examples, a residual solvent was not detected. Thus, it is considered that the separator of the present invention has a less residual amount of the high boiling point solvent in the dried coating layer, and thus, has excellent air permeability and adhesion properties.

The invention claimed is:

1. A composition for coating a separator, the composition comprising:
   a polyamic acid having a weight average molecular weight (Mw) of 50,000 to 130,000;
   a solvent having a boiling point less than 150° C.; and
   inorganic particles, the inorganic particles being present in the composition in a greater weight than the polyamic acid, wherein:
   the polyamic acid is represented by one of the following Chemical Formula 5 to 7:

[Chemical Formula 5]

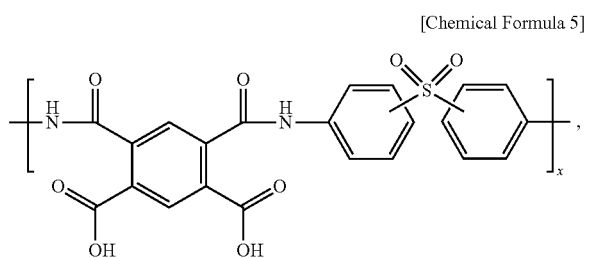

wherein x is an integer of 30 to 10,000 in Chemical Formula 5,

[Chemical Formula 6]

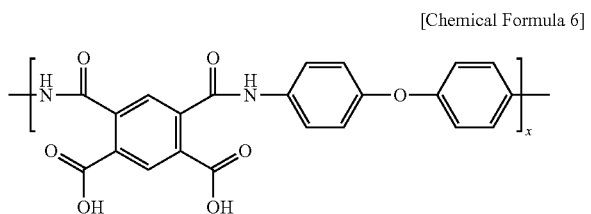

wherein x and y are an integer of 15 to 5,000, respectively, in Chemical Formula 6,

[Chemical Formula 7]

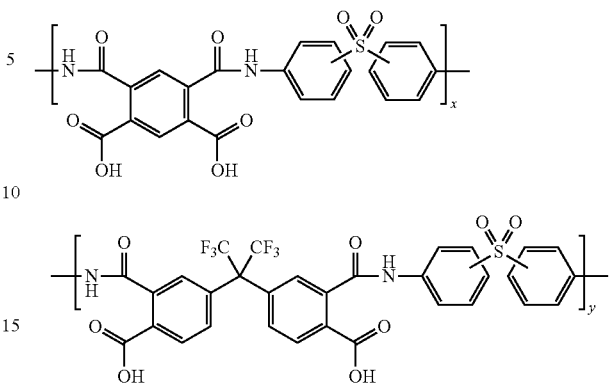

wherein x and y are an integer of 15 to 5,000, respectively, in Chemical Formula 7.

2. The composition as claimed in claim 1, wherein the solvent having a boiling point less than 150° C. is acetone.

3. The composition as claimed in claim 1, further comprising a solvent having a boiling point of 150° C. or more, wherein:
   a weight ratio of the solvent having a boiling point less than 150° C. : the solvent having a boiling point of 150° C. or more is 9:1 to 6:4,
   a ratio x:y is 1:9 to 5:5 in Chemical Formula 6,
   a ratio x:y is 1:9 to 5:5 in Chemical Formula 7, and
   the polyamic acid is not imidized but is present in the form of the polyamic acid.

4. The composition as claimed in 3, wherein the solvent having a boiling point of 150° C. or more includes one or more of dimethylformamide, dimethylsulfoxide, dimethylacetamide, dimethylcarbonate or N-methylpyrrolidone.

5. A separator, comprising:
   a polyolefin-containing substrate film; and
   a coating layer on at least one surface of the substrate film, wherein:
   the coating layer includes a polyamic acid having a weight average molecular weight (Mw) of 50,000 to 130,000 and inorganic particles, the inorganic particles being present in the coating layer in a greater weight than the polyamic acid,
   the coating layer has an organic solvent residual amount of 500 ppm or less therein, and
   the polyamic acid is represented by one of the following Chemical Formula 5 to 7:

[Chemical Formula 5]

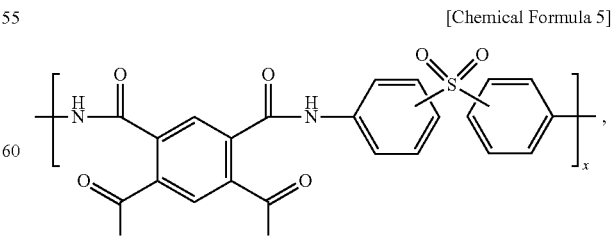

wherein x is an integer of 30 to 10,000 in Chemical Formula 5,

[Chemical Formula 6]

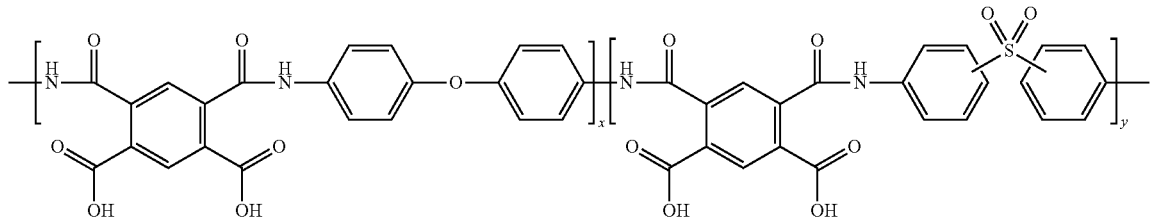

wherein x and y are an integer of 15 to 5,000, respectively, in Chemical Formula 6,

[Chemical Formula 7]

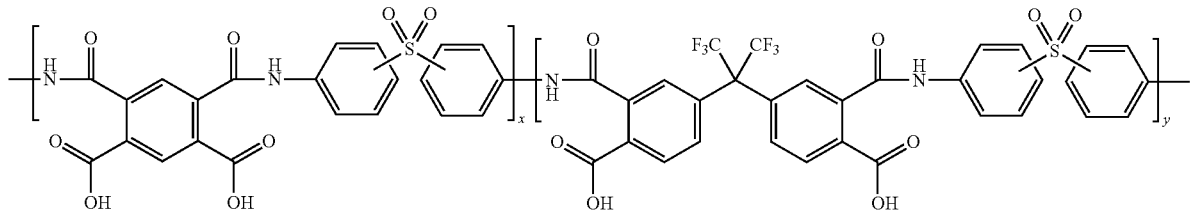

wherein x and y are an integer of 15 to 5,000, respectively, in Chemical Formula 7.

6. The separator as claimed in claim 5, wherein the organic solvent has a boiling point higher than the melting point of the substrate film.

7. The separator as claimed in claim 5, wherein the separator has thermal shrinkage of 20% or less in a machine direction and a transverse direction, respectively, after being left at 200° C. for 1 hour.

8. The separator as claimed in claim 5, wherein the separator has thermal shrinkage of 5% or less in a machine direction and a transverse direction, respectively, after being left at 200° C. for 1 hour.

9. A method of preparing a coated separator, the method comprising:
applying a coating composition containing a polyamic acid having a weight average molecular weight (Mw) of 50,000 to 130,000, inorganic particles in a greater weight than the polyamic acid, a solvent having a boiling point less than 150° C., and a solvent having a boiling point of 150° C. or more on at least one surface of a polyolefin-containing substrate film, and
drying the applied coating composition to form a coating layer, wherein:
the polyamic acid is represented by one of the following Chemical Formula 5 to 7:

[Chemical Formula 5]

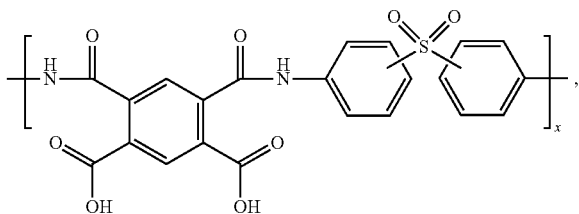

wherein x is an integer of 30 to 10,000 in Chemical Formula 5,

[Chemical Formula 6]

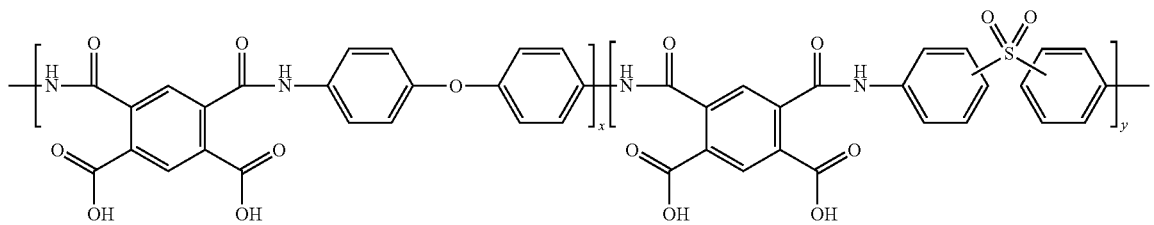

wherein x and y are an integer of 15 to 5,000, respectively, in Chemical Formula 6,

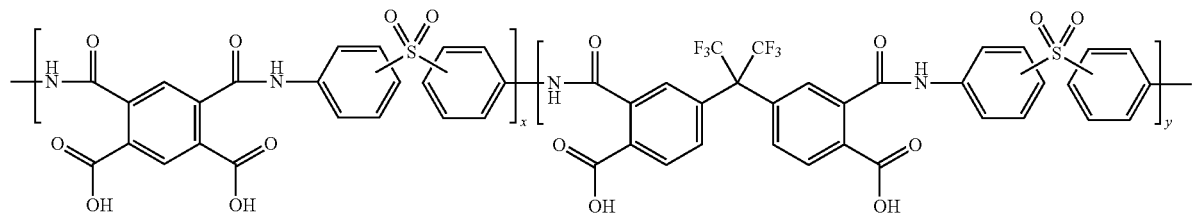

[Chemical Formula 7]

wherein x and y are an integer of 15 to 5,000, respectively, in Chemical Formula 7.

10. The method as claimed in claim 9, wherein, after the drying, a residual amount of solvent in the coating layer is 500 ppm or less.

11. An electrochemical battery, comprising:
a cathode, an anode, the separator as claimed in claim 5, and an electrolyte.

12. The electrochemical battery as claimed in claim 11, wherein the electrochemical battery is a lithium secondary battery.

13. The composition as claimed in claim 1, wherein each of the sulfone groups in the Chemical Formulae 5 to 7 is a substituent in an ortho-, meta- or para- position to an amine group.

14. The separator as claimed in claim 5, wherein:
a ratio x:y in Chemical Formula 6 is 1:9 to 5:5,
a ratio x:y is 1:9 to 5:5 in Chemical Formula 7, and
the polyamic acid is not imidized in the coating layer but is present in the form of the polyamic acid.

15. The method as claimed in claim 9, wherein:
a weight ratio of the solvent having a boiling point less than 150° C. : the solvent having a boiling point of 150° C. or more is 9:1 to 6:4,
a residual amount of the first and the second solvent in the coating layer is 500 ppm or less, and
the polyamic acid is not imidized in the coating layer but is present in the form of the polyamic acid.

* * * * *